(12) United States Patent
Clark

(10) Patent No.: US 6,215,586 B1
(45) Date of Patent: *Apr. 10, 2001

(54) ACTIVE OPTICAL IMAGE ENHANCER FOR A MICROSCOPE

(75) Inventor: Natalie Clark, Albuquerque, NM (US)

(73) Assignee: R.K.C. Technologies Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,652

(22) Filed: May 25, 1999

(51) Int. Cl.[7] .................................................. G02B 21/36
(52) U.S. Cl. ........................ 359/363; 359/383; 359/389; 359/391; 359/392; 348/73; 348/75; 348/79; 396/432
(58) Field of Search ..................................... 359/363, 369, 359/383, 389, 392, 391; 348/73, 75, 79; 396/432

(56) References Cited

U.S. PATENT DOCUMENTS

| | | | |
|---|---|---|---|
| 3,563,150 | * 2/1971 | Klemann et al. | 95/42 |
| 4,791,310 | * 12/1988 | Honig et al. | 250/458 |
| 5,497,267 | * 3/1996 | Ishikawa et al. | 359/390 |
| 5,548,661 | * 8/1996 | Price et al. | 382/133 |

* cited by examiner

*Primary Examiner*—Cassandra Spyrou
*Assistant Examiner*—Craig Curtis
(74) *Attorney, Agent, or Firm*—Robert W. Becker & Associates

(57) ABSTRACT

An active optical image enhancer for a microscope, and a method of enhancing an image for a microscope, are provided. The image enhancer has a tube for attachment to a microscope. Photo-detector elements are disposed on an end of the tube remote from an end thereof that is attachable to the microscope. Lens elements are disposed in or on the tube between the photo-detector elements and the end of the tube that is attachable to the microscope. The optical path length of the tube is adjustable via an appropriate device.

1 Claim, 2 Drawing Sheets

ACTIVE OPTICAL IMAGE ENHANCER FOR A MICROSCOPE

BACKGROUND OF THE INVENTION

The present invention relates to an active optical image enhancer for a microscope.

Currently, microscopy systems, including fluorescence microscopy systems, suffer from poor performance due to inherent limitations in the microscope instrumentation itself. The major drawback associated with conventional microscopy is the out-of- focus stray light that causes the image to be severely degraded. Confocal microscopes overcome the stray light problems by including complex mechanical equipment that filters out the unwanted stray light. All confocal microscopes use a tiny pinhole or slit to force the microscope to only focus on one layer. Thus, the out-of-focus stray light is virtually eliminated making it possible to study thicker specimens and to make 3D reconstructions of the specimens. However, the tiny pinhole (often 20 microns in diameter) severely restricts the amount of light throughput making it difficult to detect low light FISH signals.

The inventive system enables an image with a large depth of field to be formed. One particular application is FISH (Fluorescent in-situ hybridization). The ability to spatially locate segments of DNA, RNA and proteins in tissues and individual cells is rapidly providing new information in many fields including all areas of cancer research, diagnosis, and staging. To date all FISH detection and dot counting devices are limited by the quality of the images. In addition, many biological problems cannot be characterized by the examination of a single parameter; therefore, it is necessary to be able to detect two or more fluorescent signals in the same tissue or cell. Conventional fluorescence microscopy, confocal microscopy, and deconvolution techniques have been extremely useful for viewing and analyzing labeled DNA, RNA and proteins. Current research and commercially available products focus automatically only on each field of view (FOV). All such focusing techniques are based on optimizing some arbitrary metric (such as contrast or intensity). Hence, such focusing techniques do not lend themselves to producing images with a large depth of field.

Several methods and apparatus are known for adjusting images. For example, U.S. Pat. No. 5,621,495 enhances human feeling and sensitivity to depth of focus. This is accomplished by using conventional optical variation of F-number to achieve the perceived enhancement. U.S. Pat. No. 5,617,257 discloses a technique of using a plate lodged in a housing that is placed in proximity to each objective lens of a binocular arrangement to change the focal range. U.S. Pat. No. 5,483,055 discloses a method and apparatus for performing automatic focus on a confocal microscope. A coarse z-stage movement is used with a threshholded photo-detector to determine focus. This very slow technique, which works only with a conventional confocal microscope, cannot produce an enhanced depth of field in near-real time.

It is an object of the present invention to provide an improved means for producing microscope images having an enhanced depth of field.

BRIEF DESCRIPTION OF THE DRAWINGS

This object, and other objects and advantages of the present invention, will appear more clearly from the following specification in conjunction with accompanying schematic drawings, in which.

SUMMARY OF THE INVENTION

The image enhancer of the present invention provides a tube for attachment to a microscope, photo-detector elements that are disposed on an end of the tube remote or opposite of the end thereof that is attachable to the microscope, lens means that are disposed in or on the tube between the photo-detector elements and that end of the tube that is attachable to the microscope, and means for adjusting the optical path length of the tube. The technique utilized by the inventive active optical image enhance for producing images with an enhanced depth of field is discussed in detail in my U.S. patent application Ser. No. 09/289,531.

The inventive image enhancer automatically compensates for the defocus aberrations in the system, thus enabling images with an enhanced depth of field to be formed. This frees the operator from manually focusing on each cell and/or collecting a sequence of images for each layer. Thus, the active optic system can be used to enhance confocal microscope systems.

Depth of field is a critical subsystem in any automated fluorescent dot counting system. If the depth of field is poor, the image analysis will fail and the results are not accurate and hence are unreliable. To date all auto focusing techniques are based on some arbitrary image metric (such as contrast or intensity). Such image metric-based techniques are not reliable and have problems working in low light applications such as FISH signal counting. Consequently, current metric-based focusing techniques only focus on a point-like object in the center of the FOV. The present invention does not suffer from any of these drawbacks since it is based on my aforementioned Real-Time Optical Information Processing invention, which determines the amount of defocus based on the physics of light propagation.

Since the inventive technique is based on the physics of light propagation and not an arbitrary image metric (such as contrast or peak intensity), the invention applies to all images—not just FISH signals. This allows my technique to be used to produce diffraction-limited images on a wider variety of applications. Currently, all such depth-of-field enhancement techniques under research only focus on the entire FOV. This increases the unreliability and bias of automated dot counting. Unlike all current depth-of-field enhancement techniques, my technique allows each point in the FOV to be focused.

Further specific features of the present invention will be described in detail subsequently.

DESCRIPTION OF PREFERRED EMBODIMENTS

Figure 1:
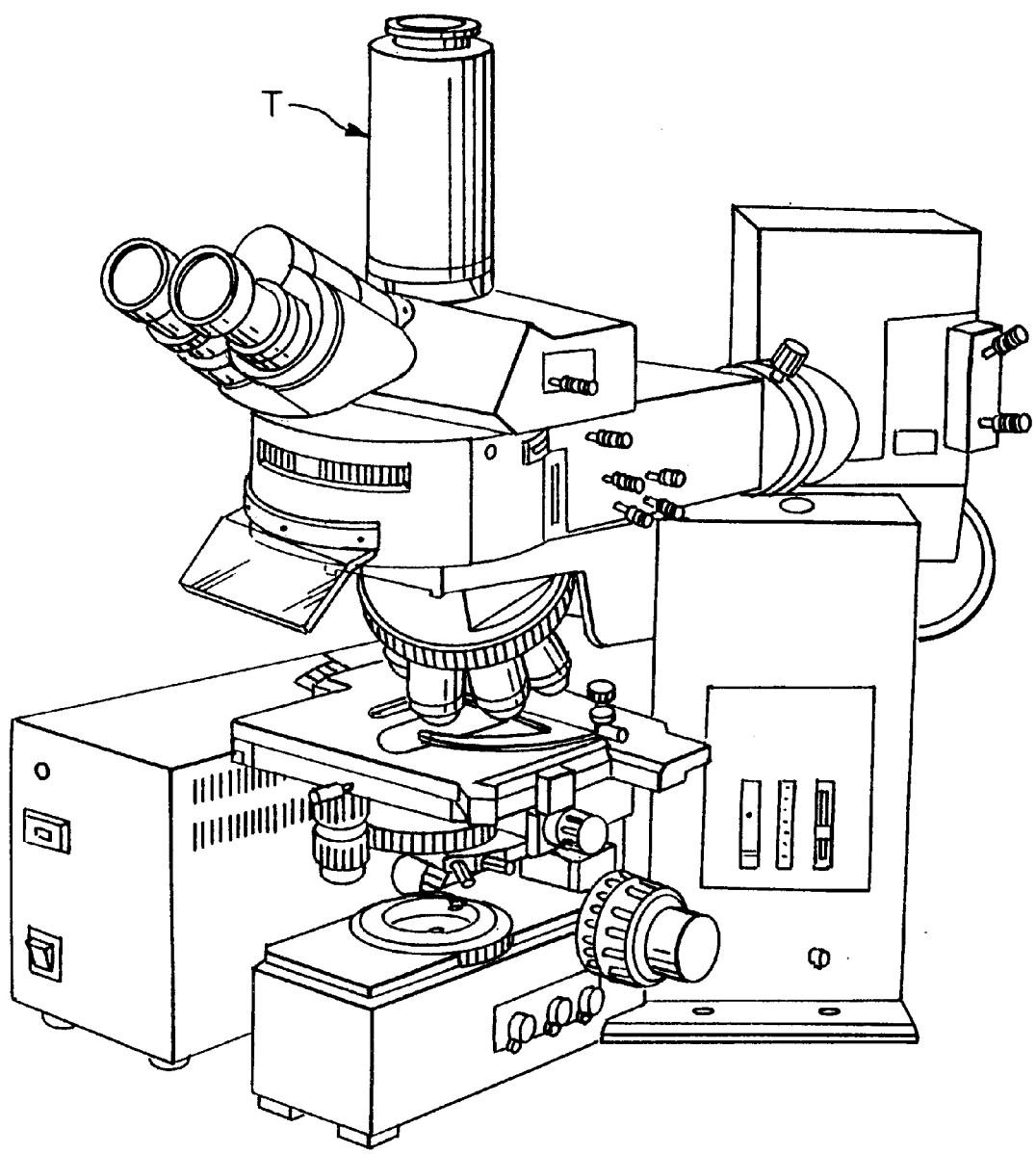
FIG. 1 illustrates a prior art microscope system.

Referring now to the drawings in detail, FIG. 1 illustrates a commercially available microscope, with the illustrated example being an Olympus Microscope. Many high end microscopes have a tube T similar to the one illustrated in FIG. 1, with the tube T serving the purpose of providing proper spacing for imaging. The active optical image enhancer of the present invention replaces the spacer tube T.

Figure 2:
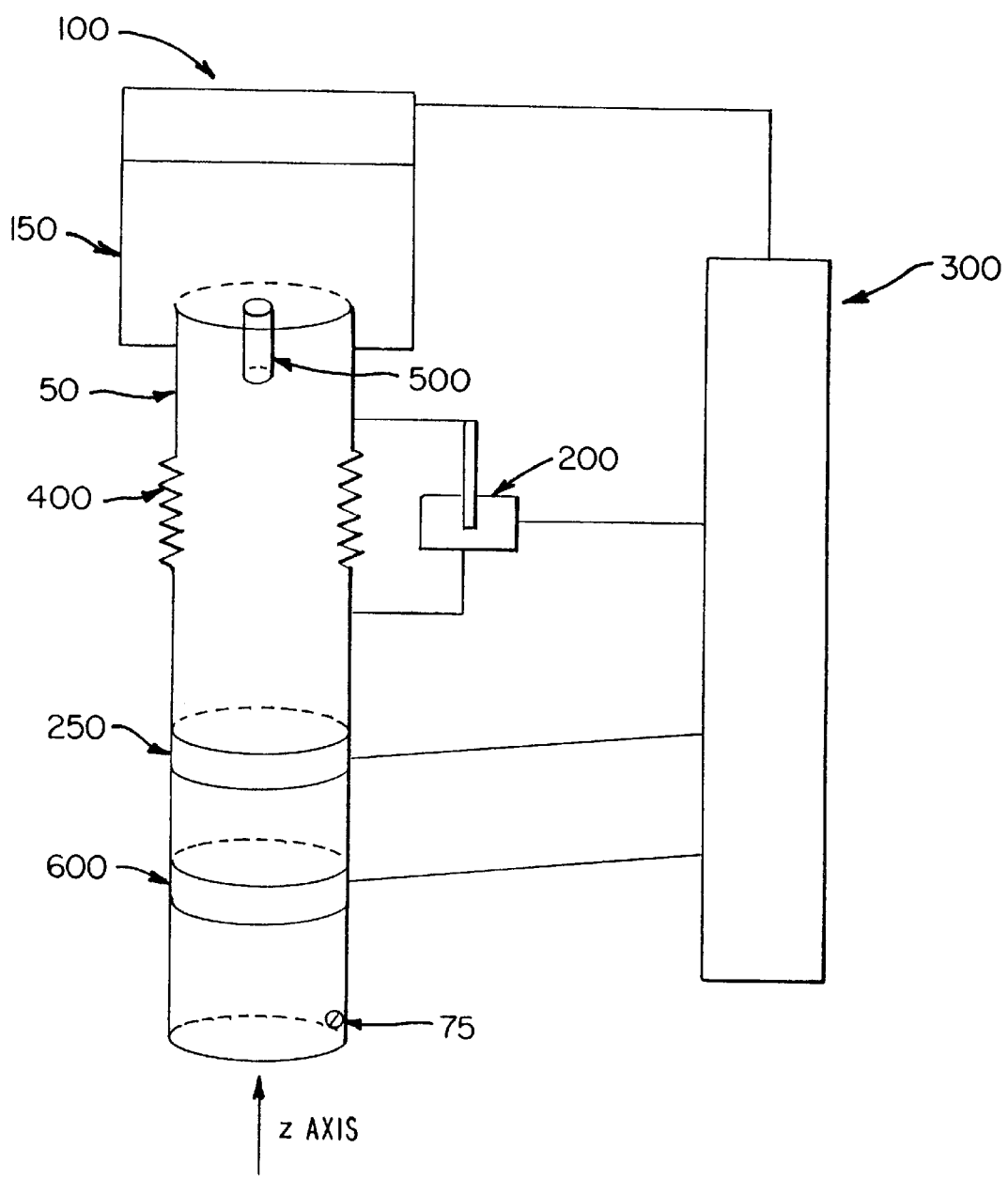
FIG. 2 illustrates one exemplary embodiment of the inventive active optical image enhancer for a microscope.

FIG. 2 illustrates one exemplary embodiment of the novel active optical image enhancer of the present invention. A tube 50 is provided that can be attached to a microscope by any convenient means; in the illustrated embodiment, such attachment is indicated by the set screw 75. However, it is to be understood that any other convenient means could also be provided such as threadedly connecting the tube 50 to a microscope. Photo-detector elements 100, on which an image of a specimen is formed, are spaced at the proper distance from the upper end of the tube 50 by appropriate spacer or connector means by which the photo-detector elements 100 are placed on or attached to the tube 50 in any convenient manner. Such a spacer or connector means 150 is commercially available.

The image formed by a microscope consists of a plurality of specimen objects which a user wishes to observe. In a conventional microscope, frequently not all of the objects are in focus because each specimen object may be located in a different plane along the "z" axis. Hence, in a conventional microscope the limited depth of field allows only those specimens that are disposed in the same plane (in terms of optical path) to be in focus. The present invention forms an image within an enhanced depth of field so that all of the specimens are in focus. This is accomplished by adjusting the optical path length of the tube 50. In particular, this is effected by controlling means that adjust the optical length of the tube 50, with such control being effected in response to signals from the photo-detector elements. The adjusting means can, for example, be a stepper motor 200 and/or a phase modulating spatial light modulator 250. In one specific embodiment of the present invention, the stepper motor utilized was an Eastern Air model LA 23 ECKY-200A. Typical high end stepper motors such as this Eastern Air stepper motor have step intervals of 0.5 microns. If higher stepper resolution is required, it would also be possible to use a phase modulating spatial light modulator 250, which in one specific embodiment of the present invention was a Meadowlark Optics Varible Retarder that was utilized for detecting FISH signals. Such spatial light modulators could also be provided with a polarizer, if necessary. Alternatively, the spatial light modulator can comprise any phase modulation device, such as a micro-mirror or liquid crystal wave plates. To effect control in response to signals from the photo detector elements, the stepper motor 200 and the phase modulating spatial light modulator 250 can be easily interfaced to a data processing unit, such as a standard PC computer 300.

The function of the stepper motor 200 and/or the phase modulation spatial light modulator 250 is to adjust the optical path length of the tube 250 to thereby compensate for defocus aberrations and thereby enhance the depth of field to bring all of the specimens into focus. Combining the stepper motor and the phase modulating spatial light modulator enables one to obtain a wider dynamic range of compensation while maintaining fine compensation via the spatial light modulator. If the resolution obtained with the stepper motor is sufficient, it is not necessary to utilize the spatial light modulator. Similarily, if the system does not require a large dynamic range (exceeding two microns), then the stepper motor is not necessary. The technique utilized to create the enhanced field of view image is described in greater detail in my aforementioned pending U.S. patent application Ser. No. 09/289,531, which is hereby incorporated into this text by this reference thereto. Summarized briefly, this technique utilizes the following transport equation to compute the amount of defocus for each photo-detector element 100:

$$\nabla_\perp I \cdot \nabla_\perp W + I \nabla_\perp^2 W + \frac{\partial I}{\partial z} = 0$$

where $$\nabla_\perp \equiv \frac{\partial}{\partial x} + \frac{\partial}{\partial y}$$

is the gradient operator in the (x,y) plane which is normal to the direction of beam propagation, with z being the direction of beam propagation, I being the irradiance of the light incident upon the photo-detector elements, and W being the phase term in terms of wavelength A.

The first term $\nabla_\perp I \cdot \nabla_\perp W$ is referred to as the prism term; it represents the irradiance variation induced by the transverse shift associated with the inhomogeneous beam to the local tilt of the wavefront in the direction of $\nabla_\perp W$. The second term, $I \nabla_{195}^2 W$ is referred to as the lens term; it describes the convergence (or divergence) of the beam. The local focal length of the lens term is inversely proportional to the lens term. The third term, $\partial I / \partial z$ describes the propagation of the beam irradiance induced by the lens and prism term.

Assuming uniform illumination of $1_o$ over the pupil (and zero outside), then $\nabla I=0$ everywhere except at the pupil edge where $$\nabla I = -I_0 n \delta_c$$

where $\delta_c$ is the Dirac delta distribution around the edge of the pupil and n is the unit vector orthogonal to the edge and pointing outward. Substituting into the transport equation yields, $$\frac{I}{I_0} \frac{\partial I}{\partial z} = \frac{\partial w}{\partial n} \delta_c - P \nabla^2 W$$

where P(x,y) is the pupil function defined to be 1 inside the pupil and 0 outside the pupil. The wavefront derivative of the pupil edge in the outward direction is mathematically expressed as $$\frac{\partial W}{\partial n} = n \cdot \nabla W.$$

The stepper motor 200 and/or phase modulating spatial light modulator 250 combination is then used to compensate for the defocus, thus creating an image with an enhanced depth of field.

In order to utilize the stepper motor 200 for adjusting the optical path length of the tube 50, the tube is a variable length tube that is capable of being extended and retracted. This is accomplished by providing the bellows 400, which furthermore ensures that the device will not allow any stray light to enter. The tube 50 could also be made extendable or retractable by providing telescoping tube sections as an alternative to the bellows 400 or in addition thereto. And at any rate, by making the tube 50 a variable length tube extension or retraction can be accomplished by the stepper motor 200 or some other similar means.

An optical lens element 500 is provided that is the same optical element as provided with the particular microscope. An optional tunable, i.e. adjustable, filter 600 can be used to compensate for chromatic defocus aberrations. A wide variety of liquid crystal tunable filters can be used. One widely known and commercially available liquid crystal tunable filter is the CRI (Cambridge Research Institute) filter. The CRI tunable filters are easy to use since they connect directly to the serial port of any computer.

The present invention is, of course, in no way restricted to the specific disclosure of the specification and drawings, but also encompasses any modifications within the scope of the appended claims.

What is claimed is:

1. A method of enhancing depth of field for a microscope, including the steps of:

providing a tube that is attachable to a microscope, wherein said tube is a variable length tube that is capable of being extended and retracted;

disposing photo-detector elements on an end of said tube that is remote from an end of said tube that is attachable to said microscope;

disposing lens means in or on said tube between said photo-detector elements and said end of said tube that is attachable to said microscope;

adjusting an optical path length of said tube to produce a higher depth of field; and controlling said adjusting step in response to signals from said photo-detector elements in conformity with a transport equation as follows:

$$\nabla_\perp I \cdot \nabla_\perp W + I \nabla_\perp^2 W + \frac{\partial I}{\partial z} = 0$$

where 1 is the irradiance of light incident upon the photo-detector elements, W is a phase term in terms of wavelength, $\lambda$, and Z is the direction of beam propagation.

* * * * *